US009391436B2

(12) United States Patent
Luebke et al.

(10) Patent No.: US 9,391,436 B2
(45) Date of Patent: Jul. 12, 2016

(54) JUNCTION ASSEMBLY AND WIRING DEVICE THEREFOR (71) Applicant: EATON CORPORATION, Cleveland, OH (US)

(72) Inventors: Charles John Luebke, Menomonee Falls, WI (US); Joseph E. Frailing, Menomonee Falls, WI (US)

(73) Assignee: EATON CORPORATION, Cleveland, OH (US)

( * ) Notice: Subject to any disclaimer, the term of this patent is extended or adjusted under 35 U.S.C. 154(b) by 97 days.

(21) Appl. No.: 14/446,935

(22) Filed: Jul. 30, 2014

(65) Prior Publication Data
US 2016/0036210 A1   Feb. 4, 2016

(51) Int. Cl.
*H02G 3/08*   (2006.01)
(52) U.S. Cl.
CPC ..................... *H02G 3/081* (2013.01)
(58) Field of Classification Search
USPC ........................................................... 174/53
See application file for complete search history.

(56) References Cited

U.S. PATENT DOCUMENTS

| 5,844,326 | A | 12/1998 | Proctor et al. | |
|---|---|---|---|---|
| 5,907,126 | A * | 5/1999 | Cancellieri | H02G 3/18 174/54 |
| 6,166,618 | A | 12/2000 | Robertson et al. | |
| 6,468,107 | B1 * | 10/2002 | Nice | H02G 3/18 174/53 |
| 6,664,471 | B1 * | 12/2003 | Howe, Jr. | H02G 3/14 174/66 |
| 6,707,652 | B2 | 3/2004 | Engel | |
| 6,791,030 | B1 | 9/2004 | Seff | |
| 7,400,255 | B2 | 7/2008 | Horch | |
| 7,479,030 | B2 * | 1/2009 | Tiberio | H01R 13/748 174/66 |
| 8,295,016 | B2 | 10/2012 | Elms | |
| 8,710,367 | B2 * | 4/2014 | Korcz | H02G 3/085 174/50 |

* cited by examiner

*Primary Examiner* — Dhirubhai R Patel
(74) *Attorney, Agent, or Firm* — Eckert Seamans Cherin & Mellott, LLC; John P. Powers; Grant E. Coffield (57) ABSTRACT

A wiring device is for a junction assembly. The junction assembly includes a housing. The wiring device includes a body at least partially extending into the housing, and at least one mounting member coupled to the body and including a number of protrusions extending away from the body. The mounting member moves between an extended position and a retracted position. When the mounting member is in the extended position, the mounting member maintains the body in a predetermined position with respect to the housing. Responsive to the mounting member moving from the extended position toward the retracted position, the protrusions move toward the body, thereby releasing the body from the housing.

17 Claims, 10 Drawing Sheets

JUNCTION ASSEMBLY AND WIRING DEVICE THEREFOR

BACKGROUND

1. Field

The disclosed concept pertains generally to electrical equipment and, more particularly, to junction assemblies. The disclosed concept also relates to wiring devices such as, for example, receptacles for junction assemblies.

2. Background Information

Electrical equipment, such as receptacles, switches, or other wiring devices, are commonly employed in residential, commercial, and industrial applications. Typically, in order to install such electrical equipment in suitable enclosures, significant labor time is required. For example, known receptacles commonly employ numerous screws or other similar fasteners in order to be secured within an enclosure. In order to install and remove the receptacle from the enclosure, the fasteners must be removed. Further disadvantages include the risk of loss of the fasteners as well as the use of additional separate tools to install and remove the fasteners.

There is thus room for improvement in junction assemblies and in wiring devices therefor.

SUMMARY

These needs and others are met by embodiments of the disclosed concept wherein at least one mounting member is provided, which among other benefits, enables a wiring device to be relatively quickly and easily be selectively maintained and released from a housing.

In accordance with one aspect of the disclosed concept, a wiring device for a junction assembly is provided. The junction assembly includes a housing. The wiring device comprises: a body structured to at least partially extend into the housing; and at least one mounting member coupled to the body and comprising a number of protrusions extending away from the body. The mounting member is structured to move between an extended position and a retracted position. When the mounting member is in the extended position, the mounting member is structured to maintain the body in a predetermined position with respect to the housing. Responsive to the mounting member moving from the extended position toward the retracted position, the number of protrusions move toward the body, thereby releasing the body from the housing.

As another aspect of the disclosed concept, a junction assembly comprises: a housing; and a wiring device comprising: a body at least partially extending into the housing, and at least one mounting member coupled to the body and comprising a number of protrusions extending away from the body. The mounting member is structured to move between an extended position and a retracted position. When the mounting member is in the extended position, the mounting member maintains the body in a predetermined position with respect to the housing. Responsive to the mounting member moving from the extended position toward the retracted position, the number of protrusions move toward the body, thereby releasing the body from the housing.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

Figure 1A:
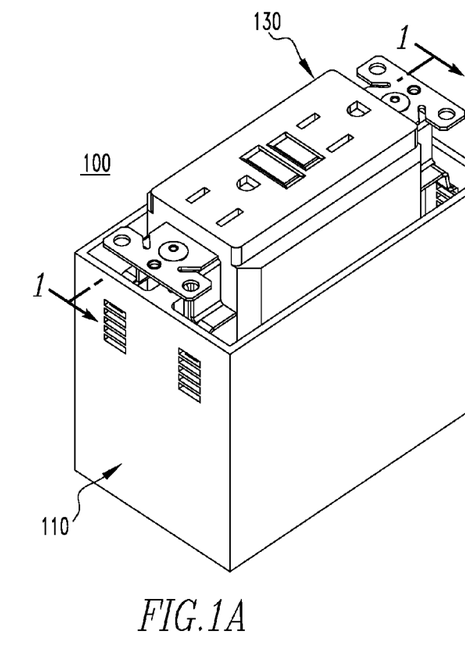
FIGS. 1A and 1B are front isometric and exploded front isometric views, respectively, of a junction assembly and wiring device therefor, in accordance with an embodiment of the disclosed concept.
Figure 1B:
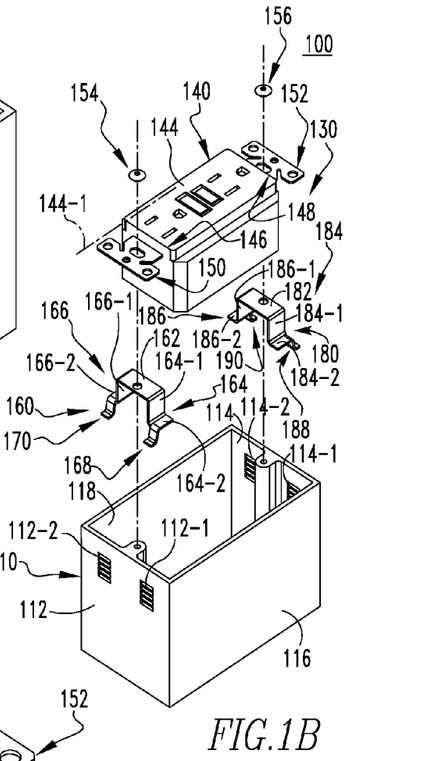

FIGS. 1A and 1B show a junction assembly 100 in accordance with the disclosed concept. The example junction assembly 100 includes a housing 110 and a wiring device 130 structured to be removably coupled to the housing 110. Referring to FIG. 1B, the wiring device 130 has a body 140 and a number of mounting members 160,180 (two are shown). The body 140 partially extends into the housing 110 and has a distal surface 144 located in a plane 144-1. Additionally, the body 140 includes a first end portion 146 and a second end portion 148 opposite the first end portion 146. The wiring device 130 further has a number of support portions 150,152 (two are shown) structured to support the wiring device 130 during installation. In the example shown, a first support portion 150 is located on the first end portion 146 and a second support portion 152 is located on the second end portion 148. The mounting member 160 is located proximate the first end portion 146 and the mounting member 180 is located proximate the second end portion 148. The wiring device 130 further includes a number of fasteners 154,156 (e.g., without limitation, rivets) (two are shown) structured to extend through the support portions 150,152 and the mounting members 160,180 in order to fasten the mounting members 160,180 to the corresponding support portions 150,152, respectively. The fasteners 154,156 also allow the wiring device 130 to be adjusted at installation for plumb. Specifically, the fasteners 154,156 are movable with respect to the respective support portions 150,152, thereby enabling the wiring device 130 to slide or rotate and properly be plumbed.

Figure 1C:
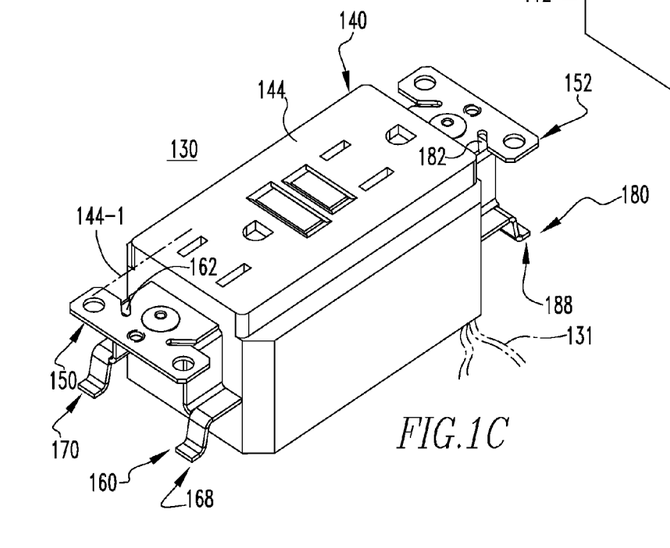
FIG. 1C is a front isometric view of the wiring device of FIGS. 1A and 1B.

Each of the mounting members 160,180 respectively includes a base 162,182 and side portions 164,166,184,186 extending from the base 162,182 away from the distal surface 144. The side portions 164,166,184,186 each have a corresponding wall 164-1,166-1,184-1,186-1 extending from the corresponding base 162,182, and a platform 164-2,166-2, 184-2,186-2 extending from corresponding walls 164-1,166-1,184-1,186-1, as shown. As seen in FIG. 1C, the bases 162, 182 of the mounting members 160,180 are located near the distal surface 144 and are generally parallel to the plane 144-1. The bases 162,182 are also generally flush with the corresponding support portion 150,152, advantageously providing a relatively secure connection between the bases 162, 182 and the corresponding support portions 150,152. Additionally, the walls 164-1,166-1,184-1,186-1 are generally normal to the plane 144-1 and the platforms 164-2,166-2, 184-2,186-2 are generally parallel to the plane 144-1. The support portions 150,152 are each located between the plane 144-1 and the mounting members 160,180. The wiring device 130 further includes a number of wires 131 (shown in phantom line drawing) in order to couple the wiring device to a suitable electrical system (not shown). For ease of illustration and economy of disclosure, only the wiring device 130 is illustrated herein with wires 131, although it will be appreciated that other wiring devices described below likewise include wires.

As seen in FIG. 1B, the housing 110 includes a pair of opposing and generally parallel walls 112,114. Another pair of opposing and generally parallel walls 116,118 connects the first wall 112 to the second wall 114. The walls 112,114 each include a number of rows of slots (for ease of illustration only one slot 112-1,112-2,114-1,114-2 is indicated per row). As will be discussed in greater detail hereinbelow, the mounting members 160,180 respectively further include a number of protrusions 168,170,188,190. Each of the protrusions 168, 170,188,190 respectively extends from one of the platforms 164-2,166-2,184-2,186-2 away from the body 140 and is structured to extend into a corresponding one of the slots 112-1,112-2,114-1,114-2. The mounting members 160,180 are structured to move between an extended position and a retracted position in order to maintain the body 140 in the housing 110 and also to release the body 140 from the housing 110, as will be discussed hereinbelow.

Figure 1D:
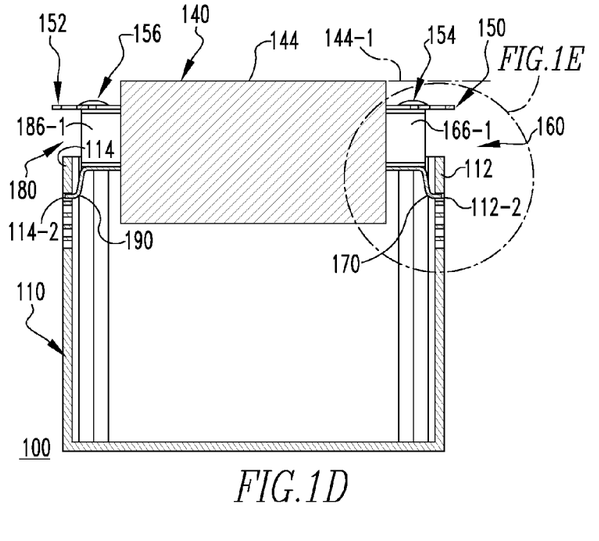
FIG. 1D is a section view of the junction assembly and wiring device therefor, taken along line 1-1 of FIG. 1A, shown with the mounting members in the extended position.

FIG. 1D shows a section view of the junction assembly 100 with the mounting members 160,180 in the extended position. As seen, each of the protrusions 170,190 extends into a corresponding one of the slots 112-2,114-2. It will be appreciated that the other protrusions (i.e., protrusion 168 of mounting member 160 and protrusion 188 of mounting member 180) likewise extend into a corresponding one of the slots (i.e., slots 112-1,114-1) when the mounting members 160, 180 are in the extended position. Furthermore, as each of the walls 112,114 has a number of rows of slots (only slots 112-2,114-2 are indicated in FIG. 1D), it will be appreciated that the body 140 may advantageously be maintained within the housing 110 at varying depths, depending on which of the rows of slots 112-1 (FIG. 1B), 112-2,114-1 (FIG. 1B) 114-2 the mounting members 160,180 extend into.

Figure 1E:
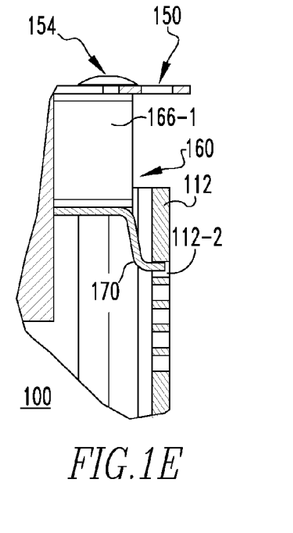
FIG. 1E is an enlarged view of a portion of the junction assembly and wiring device therefor of FIG. 1D.

Referring to FIG. 1E, when the protrusion 170 extends into the slot 112-2 (i.e., when the mounting member 160 is in the extended position), the wall 112 surrounds the protrusion 170 and prevents the protrusion 170 from moving in a direction normal to the plane 144-1 (FIGS. 1B, 1C, 1D and 1F). Similarly, when the other protrusions 168,188,190 extend into the corresponding slots 112-1,114-1,114-2, the walls 112,114 surround the corresponding protrusions 168,188,190 and prevent the protrusions 168,188,190 from moving in a direction normal to the plane 144-1. In this manner, when the mounting members 160,180 are in the extended position (FIGS. 1D and 1E), the protrusions 168,170,188,190, which are coupled to the support portions 150,152, prevent the body 140 from moving in a direction normal to the plane 144-1 of the distal surface 144. Thus, the mounting members 160,180 advantageously maintain the body 140 in a predetermined position with respect to the housing 110. In other words, the body 140 is retained or fixed in the housing 110 when the mounting members 160,180 are in the extended position (FIGS. 1D and 1E) and is only able to be released when the mounting members 160,180 move to the retracted position, as will be discussed below.

Figures 1F, 1G:
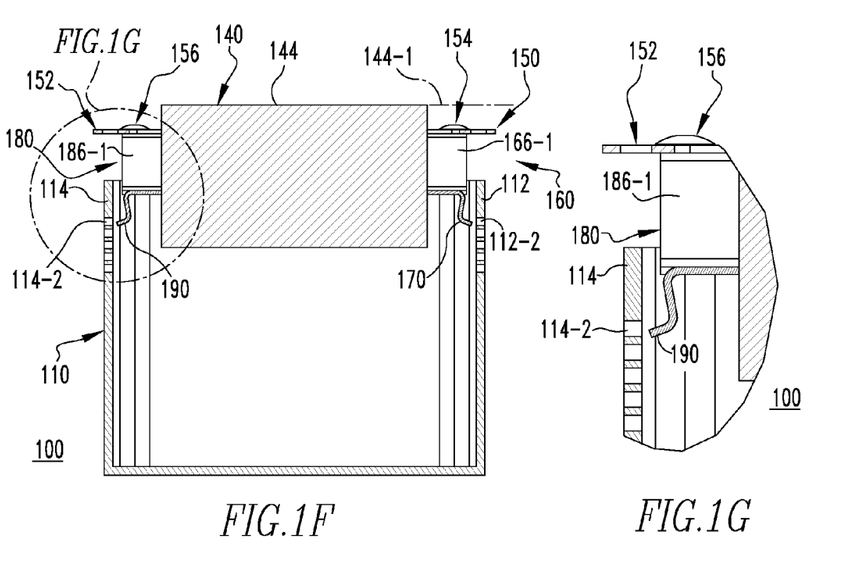
FIG. 1F is another section view of the junction assembly and wiring device therefor of FIG. 1D, shown with the mounting members in the retracted position.
FIG. 1G is an enlarged view of a portion of the junction assembly and wiring device therefor of FIG. 1F.

FIG. 1F shows a section view of the junction assembly 100 with the mounting members 160,180 in the retracted position. As seen, each of the protrusions 170,190 does not extend into a corresponding one of the slots 112-2,114-2. In other words, each of the protrusions 170,190 is entirely internal with respect to the corresponding walls 112,114 (i.e., the protrusion 170 is spaced from the plane of the generally planar wall 112 and the protrusion 190 is spaced from the plane of the generally planar wall 114). It will be appreciated that the other protrusions (i.e., protrusion 168 of mounting member 160 and protrusion 188 of mounting member 180) likewise do not extend into a corresponding one of the slots (i.e., slots 112-1,114-1) and are entirely internal with respect to the corresponding walls 112,114 when the mounting members 160,180 are in the retracted position (FIGS. 1F and 1G).

Referring to FIG. 1G, the wall 114 does not surround the protrusion 190. Similarly, when the other protrusions 168, 170,188 do not extend into the corresponding slots 112-1, 112-2,114-1, the walls 112,114 do not surround the corresponding protrusions 168,188,190. In this manner, when the mounting members 160,180 are in the retracted position (FIGS. 1F and 1G), the clearance between the mounting members 160,180 and the corresponding walls 112,114 advantageously enables the body 140 (which is coupled to the mounting members 160,180) to move in a direction normal to the plane 144-1 (FIGS. 1B, 1C, 1D and 1F). In other words, in the retracted position, the mounting members 160,180 do not maintain the body 140 in the housing 110.

As seen in FIGS. 1D and 1F, responsive to the mounting members 160,180 moving from the extended position (FIG. 1D) toward the retracted position (FIG. 1F), the respective protrusions 168 (see FIGS. 1B and 1C), 170,188 (see FIGS. 1B and 1C),190 move toward the body 140, thereby releasing the body 140 from the housing 110. Furthermore, responsive to the mounting member 160 moving from the extended position (FIG. 1D) toward the retracted position (FIG. 1F), the respective protrusions 168 (see FIGS. 1B and 1C), 170 move away from the support portion 150. Responsive to the mounting member 180 moving from the extended position (FIG. 1D) toward the retracted position (FIG. 1F), the respective protrusions 188 (see FIGS. 1B and 1C), 190 move away from the support portion 152.

In operation, by employing the mounting members 160, 180, the wiring device 130 is advantageously able to be installed, removed from, and adjusted with respect to, the housing 110 of the junction assembly 100 in less time than known junction assemblies (not shown). For example and without limitation, an operator can remove the wiring device 130 from the housing 110 by simply inserting a tool (not shown) into the housing 110 and moving either one, or both of the mounting members 160,180 from the extended position (FIGS. 1D and 1E) to the retracted position (FIGS. 1F and 1G) without employing a separate fastener. Additionally, among other benefits, there is relatively no possibility of losing parts.

Figure 2A:
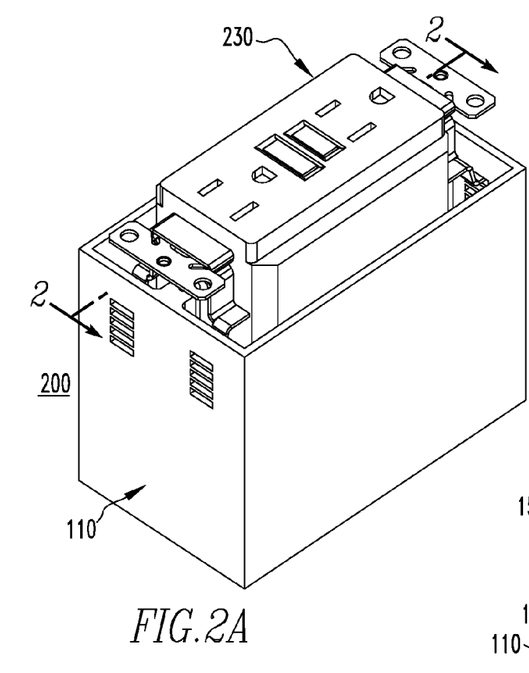
FIGS. 2A and 2B are front isometric and exploded front isometric views, respectively, of a junction assembly and wiring device therefor, in accordance with an alternative embodiment of the disclosed concept.
Figure 2B:
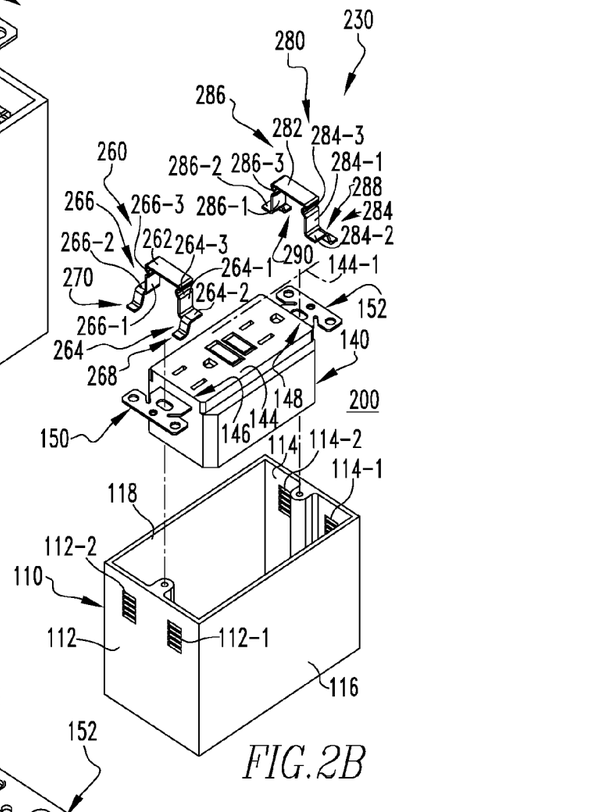

FIGS. 2A and 2B show another non-limiting example embodiment of a junction assembly 200 in accordance with the disclosed concept. The example junction assembly 200 includes the housing 110 and a wiring device 230 structured to be removably coupled to the housing 110. Referring to FIG. 2B, the wiring device 230 has the body 140 and a number of mounting members 260,280 (two are shown). The mounting member 260 is located proximate the first end portion 146 and the mounting member 280 is located proximate the second end portion 148.

Figure 2C:
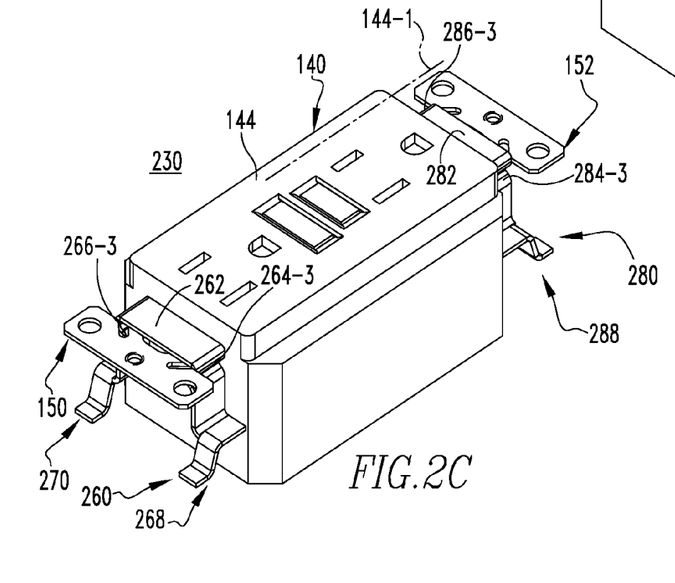
FIG. 2C is a front isometric view of the wiring device of FIGS. 2A and 2B.

Each of the mounting members 260,280 includes a respective base 262,282 and side portions 264,266,284,286 extending from the base 262,282 away from the distal surface 144. The side portions 264,266,284,286 each have a corresponding inwardly extending retention portion 264-3,266-3,284-3, 286-3 extending from the corresponding bases 262,282. The retention portions 264-3,266-3 advantageously enable the mounting member 260 to be coupled to the support portion 150 by a snap-fit mechanism. The retention portions 284-3, 286-3 advantageously enable the mounting member 280 to be coupled to the support portion 152 by a snap-fit mechanism. Furthermore, as shown in FIG. 2C, the base 262 is located between the support portion 150 and the plane 144-1, advantageously providing a relatively secure connection between the mounting member 260 and the support portion 150. Additionally, the base 282 is located between the support portion 152 and the plane 144-1, advantageously providing a relatively secure connection between the mounting member 280 and the support portion 152.

Referring again to FIG. 2B, the side portions 264,266,284, 286 of the mounting members 260,280 respectively further include a corresponding wall 264-1,266-1,284-1,286-1 extending from proximate the corresponding bases 262,282, and a corresponding platform 264-2,266-2,284-2,286-2 extending from the corresponding walls 264-1,266-1,284-1, 286-1. As seen in FIG. 2C, the bases 262,282 of the respective mounting members 260,280 are located near the distal surface 144 and are generally parallel to the plane 144-1. The bases 262,282 are also generally flush with the corresponding support portion 150,152, advantageously providing a relatively secure connection between the bases 262,282 and the corresponding support portions 150,152. Additionally, the walls 264-1,266-1,284-1,286-1 are generally normal to the plane 144-1 and the platforms 264-2,266-2,284-2,286-2 are generally parallel to the plane 144-1.

As seen in FIG. 2B, the mounting members 260,280 respectively further include a number of protrusions 268,270, 288,290, respectively. Each of the protrusions 268,270,288, 290 extends from one of the platforms 264-2,266-2,284-2, 286-2 away from the body 140, and is structured to extend into a corresponding one of the slots 112-1,112-2,114-1,114-2. The mounting members 260,280 are structured to move between an extended position and a retracted position in order to maintain the body 140 in the housing 110 and also to release the body 140 from the housing 110, as will be discussed hereinbelow.

Figure 2D:
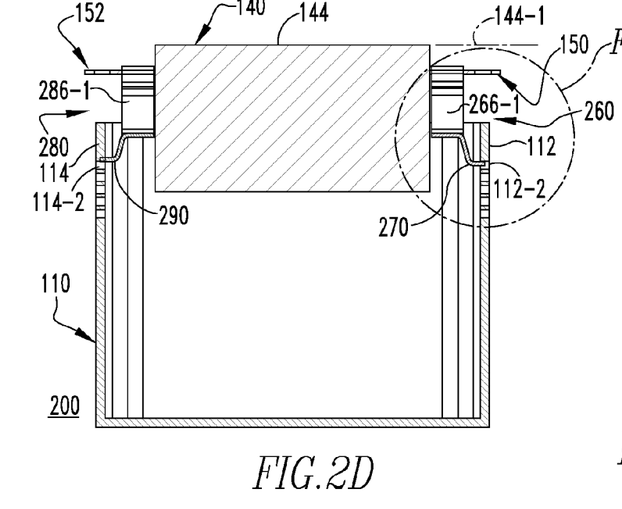
FIG. 2D is a section view of the junction assembly and wiring device therefor, taken along line 2-2 of FIG. 2A, shown with the mounting members in the extended position.

FIG. 2D shows a section view of the junction assembly 200 with the mounting members 260,280 in the extended position. As seen, each of the protrusions 270,290 extends into a corresponding one of the slots 112-2,114-2. It will be appreciated that the other protrusions (i.e., protrusion 268 of mounting member 260 and protrusion 288 of mounting member 280) likewise extend into a corresponding one of the slots (i.e., slots 112-1,114-1) when the mounting members 260, 280 are in the extended position.

Figure 2E:
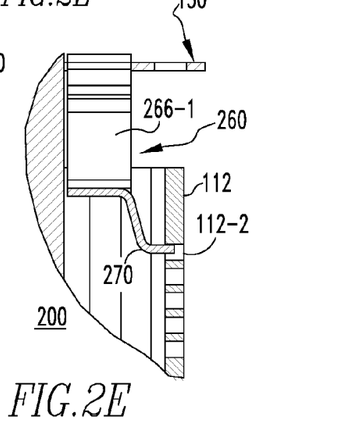
FIG. 2E is an enlarged view of a portion of the junction assembly and wiring device therefor of FIG. 2D.

Referring to FIG. 2E, when the protrusion 270 extends into the slot 112-2 (i.e., when the mounting member 260 is in the extended position), the wall 112 surrounds the protrusion 270 and prevents the protrusion 270 from moving in a direction normal to the plane 144-1 (FIGS. 2B, 2C, 2D and 2F). Similarly, when the other protrusions 268,288,290 extend into the corresponding slots 112-1,114-1,114-2, the walls 112,114 surround the corresponding protrusions 268,288,290 and prevent the protrusions 268,288,290 from moving in a direction normal to the plane 144-1. In this manner, when the mounting members 260,280 are in the extended position (FIGS. 2D and 2E), the protrusions 268,270,288,290, which are coupled to the support portions 150,152, prevent the body 140 from moving in a direction normal to the plane 144-1 of the distal surface 144. Thus, the mounting members 260,280 advantageously maintain the body 140 in a predetermined position with respect to the housing 110. In other words, the body 140 is retained or fixed in the housing 110 when the mounting members 260,280 are in the extended position (FIGS. 2D and 2E) and is only able to be released when the mounting members 260,280 move to the retracted position.

Figures 2F, 2G:
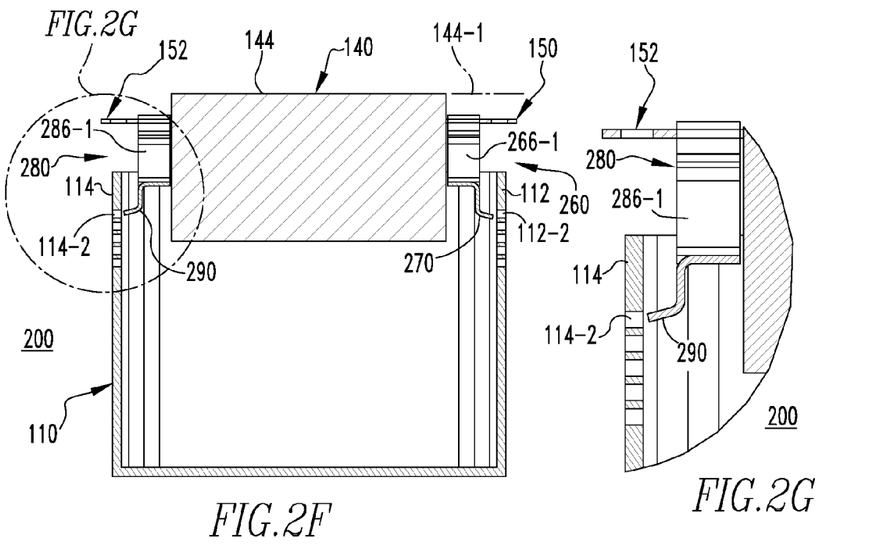
FIG. 2F is another section view of the junction assembly and wiring device therefor of FIG. 2D, shown with the mounting members in the refracted position.
FIG. 2G is an enlarged view of a portion of the junction assembly and wiring device therefor of FIG. 2F.

FIG. 2F shows a section view of the junction assembly 200 with the mounting members 260,280 in the retracted position. As seen, each of the protrusions 270,290 does not extend into a corresponding one of the slots 112-2,114-2. In other words, each of the protrusions 270,290 is entirely internal with respect to the corresponding walls 112,114 (i.e., the protrusion 270 is spaced from the plane of the generally planar wall 112 and the protrusion 290 is spaced from the plane of the generally planar wall 114). It will be appreciated that the other protrusions (i.e., protrusion 268 of mounting member 260 and protrusion 288 of mounting member 280) likewise do not extend into a corresponding one of the slots (i.e., slots 112-1,114-1) and are entirely internal with respect to the corresponding walls 112,114 when the mounting members 260,280 are in the retracted position (FIGS. 2F and 2G).

Referring to FIG. 2G, the wall 114 does not surround the protrusion 290. Similarly, when the other protrusions 268, 270,288 do not extend into the corresponding slots 112-1, 112-2,114-1, the walls 112,114 do not surround the corresponding protrusions 268,288,290. In this manner, when the mounting members 260,280 are in the retracted position (FIGS. 2F and 2G), the clearance between the mounting members 260,280 and the corresponding walls 112,114 advantageously enables the body 140 (which is coupled to the mounting members 260,280) to move in a direction normal to the plane 144-1 (FIGS. 2B, 2C, 2D and 2F). In other words, in the retracted position, the mounting members 260,280 do not maintain the body 140 in the housing 110.

As seen in FIGS. 2D and 2F, responsive to the mounting members 260,280 moving from the extended position (FIG. 2D) toward the retracted position (FIG. 2F), the respective protrusions 268 (see FIGS. 2B and 2C), 270,288 (see FIGS. 2B and 2C), 290 move toward the body 140, thereby releasing the body 140 from the housing 110. Furthermore, responsive to the mounting member 260 moving from the extended position (FIG. 2D) toward the retracted position (FIG. 2F), the respective protrusions 268 (see FIGS. 2B and 2C), 270 move away from the support portion 150. Responsive to the mounting member 280 moving from the extended position (FIG. 2D) toward the retracted position (FIG. 2F), the respective protrusions 288 (see FIGS. 2B and 2C), 290 move away from the support portion 152. It will be appreciated that by employing the mounting members 260,280, the wiring device 230 and associated junction assembly 200 has the same advantages as those discussed above with respect to the embodiment of FIGS. 1A-1G.

Figures 3A, 3B:
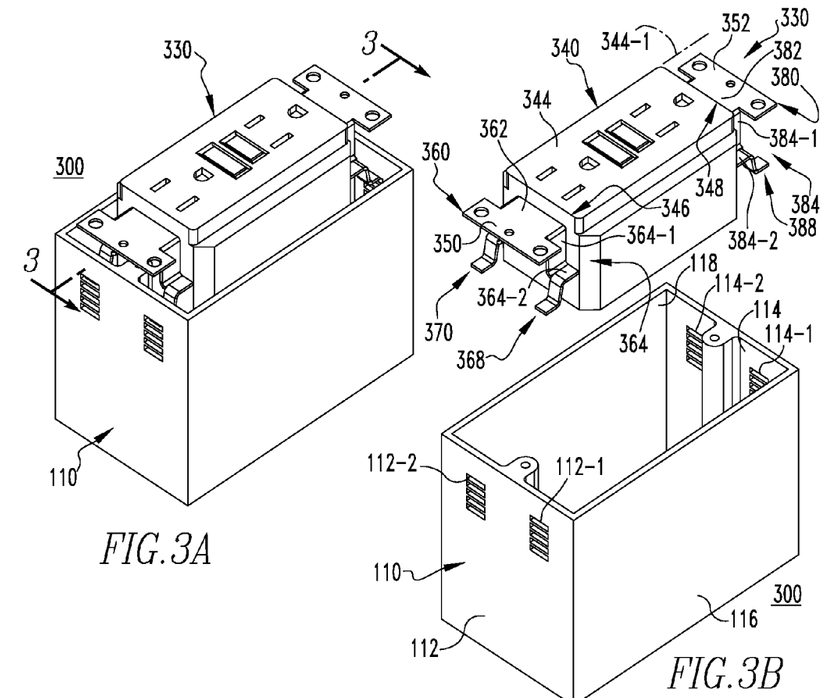
FIGS. 3A and 3B are front isometric and exploded front isometric views, respectively, of a junction assembly and wiring device therefor, in accordance with a further embodiment of the disclosed concept.

FIGS. 3A and 3B show another non-limiting example embodiment of a junction assembly 300 in accordance with the disclosed concept. The example junction assembly 300 includes the housing 110 and a wiring device 330 structured to be removably coupled to the housing 110. Referring to FIG. 3B, the wiring device 330 has a body 340 and a number of mounting members 360,380 (two are shown) coupled to the body 340. The body 340 partially extends into the housing 110 and has a distal surface 344 located in a plane 344-1.

Additionally, the body 340 includes a first end portion 346 and a second end portion 348 opposite the first end portion 346. The wiring device 330 further has a number of support portions 350,352 (two are shown) structured to support the wiring device 330 during installation. As seen, the first support portion 350 and the mounting member 360 are preferably a single piece of material. Similarly, the second support portion 352 and the mounting member 380 are preferably a single piece of material. In the example shown, a first support portion 350 is located on the first end portion 346 and a second support portion 352 is located on the second end portion 348. Additionally, the mounting member 360 is located proximate the first end portion 346 and the mounting member 380 is located proximate the second end portion 348.

Each of the mounting members 360,380 includes a respective base 362,382 and side portions 364,384 extending from the base 362,382 away from the distal surface 344. For ease of illustration and economy of disclosure, only the side portions 364,384 will be described herein, although it will be appreciated that the mounting members 360,380 each include another opposing side portion, similar to the side portions 166,186 described hereinabove in association with the wiring device 130. As seen, the base 362 is coplanar with the support portion 350 and the base 382 is coplanar with the support portion 352. Furthermore, the side portions 364,384 respectively each have a corresponding wall 364-1,384-1 extending from the corresponding bases 362,382 and a corresponding platform 364-2,384-2 extending from the corresponding walls 364-1,384-1. As seen in FIG. 3B, the bases 362,382 of the respective mounting members 360,380 are located near the distal surface 344 and are generally parallel to the plane 344-1. Additionally, the walls 364-1,384-1 are generally normal to the plane 344-1 and the platforms 364-2,384-2 are generally parallel to the plane 344-1.

As seen in FIG. 3B and as will be discussed in greater detail hereinbelow, the mounting members 360,380 respectively further include a number of protrusions 368,370,388,390 (see FIG. 3C), respectively. Each of the protrusions 368,370,388, 390 (see FIG. 3C) extends from one of the platforms (only the platforms 364-2,384-2 are indicated) away from the body 340 and is structured to extend into a corresponding one of the slots 112-1,112-2,114-1,114-2. The mounting members 360, 380 are structured to move between an extended position and a retracted position in order to maintain the body 340 in the housing 110 and also to release the body 340 from the housing 110, as will be discussed hereinbelow.

Figure 3C:
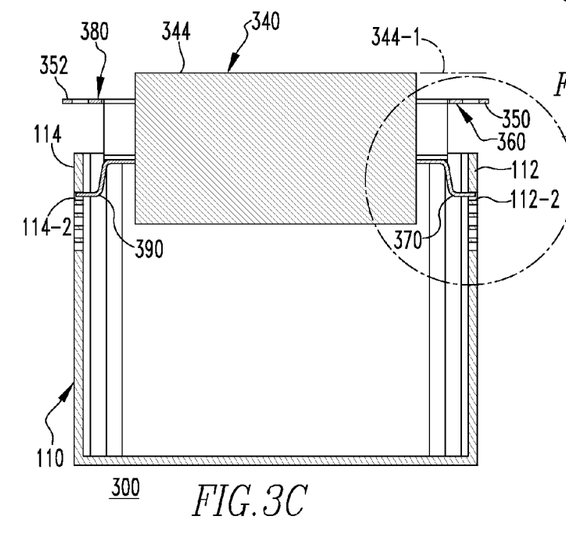
FIG. 3C is a section view of the junction assembly and wiring device therefor, taken along line 3-3 of FIG. 3A, shown with the mounting members in the extended position.

FIG. 3C shows a section view of the junction assembly 300 with the mounting members 360,380 in the extended position. As seen, each of the protrusions 370,390 extends into a corresponding one of the slots 112-2,114-2. It will be appreciated that the other protrusions (i.e., protrusion 368 of mounting member 360 and protrusion 388 of mounting member 380) likewise extend into a corresponding one of the slots (i.e., slots 112-1,114-1) when the mounting members 360, 380 are in the extended position.

Figure 3D:
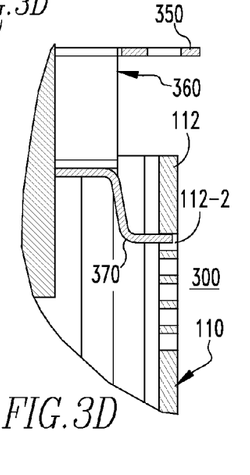
FIG. 3D is an enlarged view of a portion of the junction assembly and wiring device therefor of FIG. 3C.
Figures 3E, 3F:
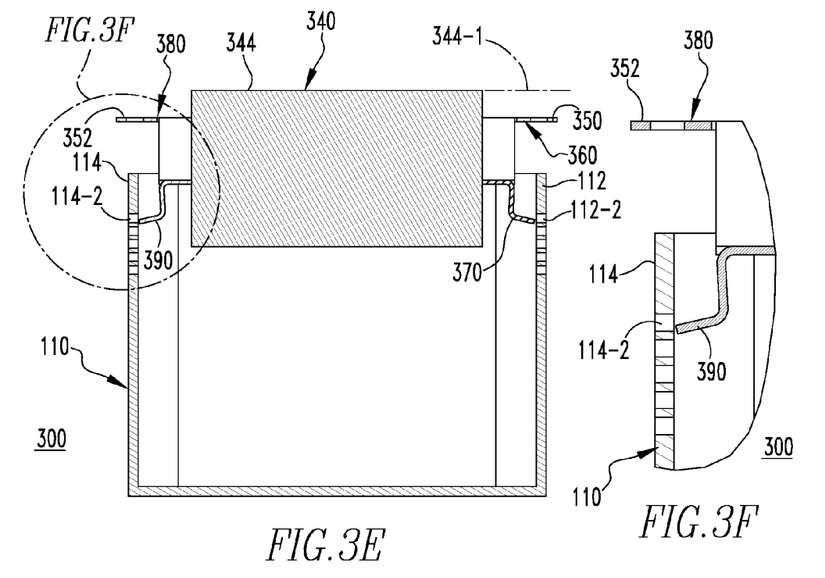
FIG. 3E is another section view of the junction assembly and wiring device therefor of FIG. 3C, shown with the mounting members in the refracted position.
FIG. 3F is an enlarged view of a portion of the junction assembly and wiring device therefor of FIG. 3E.

Referring to FIG. 3D, when the protrusion 370 extends into the slot 112-2 (i.e., when the mounting member 360 is in the extended position), the wall 112 surrounds the protrusion 370 and prevents the protrusion 370 from moving in a direction normal to the plane 344-1 (FIGS. 3B, 3C, 3E). Similarly, when the other protrusions 368,388,390 extend into the corresponding slots 112-1,114-1,114-2, the walls 112,114 surround the corresponding protrusions 368,388,390 and prevent the protrusions 368,388,390 from moving in a direction normal to the plane 344-1. In this manner, when the mounting members 360,380 are in the extended position (FIGS. 3C and 3D), the protrusions 368,370,388,390 prevent the body 340 from moving in a direction normal to the plane 344-1. Thus, the mounting members 360,380 advantageously maintain the body 340 in a predetermined position with respect to the housing 110. In other words, the body 340 is retained or fixed in the housing 110 when the mounting members 360,380 are in the extended position (FIGS. 3C and 3D) and is only able to be released when the mounting members 360,380 move to the retracted position.

FIG. 3E shows a section view of the junction assembly 300 with the mounting members 360,380 in the retracted position. As seen, each of the protrusions 370,390 does not extend into a corresponding one of the slots 112-2,114-2. In other words, each of the protrusions 370,390 is entirely internal with respect to the corresponding walls 112,114 (i.e., the protrusion 370 is spaced from the plane of the generally planar wall 112 and the protrusion 390 is spaced from the plane of the generally planar wall 114). It will be appreciated that the other protrusions (i.e., protrusion 368 of mounting member 360 and protrusion 388 of mounting member 380) likewise do not extend into a corresponding one of the slots (i.e., slots 112-1,114-1) and are entirely internal with respect to the corresponding walls 112,114 when the mounting members 360,380 are in the retracted position (FIGS. 3E and 3F).

Referring to FIG. 3F, the wall 114 does not surround the protrusion 390. Similarly, when the other protrusions 368, 370,388 do not extend into the corresponding slots 112-1, 112-2,114-1, the walls 112,114 do not surround the corresponding protrusions 368,388,390. In this manner, when the mounting members 360,380 are in the retracted position (FIGS. 3E and 3F), the clearance between the mounting members 360,380 and the corresponding walls 112,114 advantageously enables the body 340 (which is coupled to the mounting members 360,380) to move in a direction normal to the plane 344-1. In other words, in the retracted position, the mounting members 360,380 do not maintain the body 340 in the housing 110.

As seen in FIGS. 3C and 3E, responsive to the mounting members 360,380 moving from the extended position (FIG. 3C) toward the retracted position (FIG. 3E), the respective protrusions 368 (see FIG. 3B), 370,388 (see FIG. 3B), 390 move toward the body 340, thereby releasing the body 340 from the housing 110. Furthermore, responsive to the mounting member 360 moving from the extended position (FIG. 3C) toward the retracted position (FIG. 3E), the respective protrusions 368 (see FIG. 3B),370 move away from the support portion 350. Responsive to the mounting member 380 moving from the extended position (FIG. 3C) toward the retracted position (FIG. 3E), the respective protrusions 388 (see FIG. 3B), 390 move away from the support portion 352. It will be appreciated that by employing the mounting members 360,380, the wiring device 330 and associated junction assembly 300 has the same advantages as those discussed above with respect to the embodiments of FIGS. 1A-1G and 2A-2G.

Figures 4A, 4B, 4C, 4D:
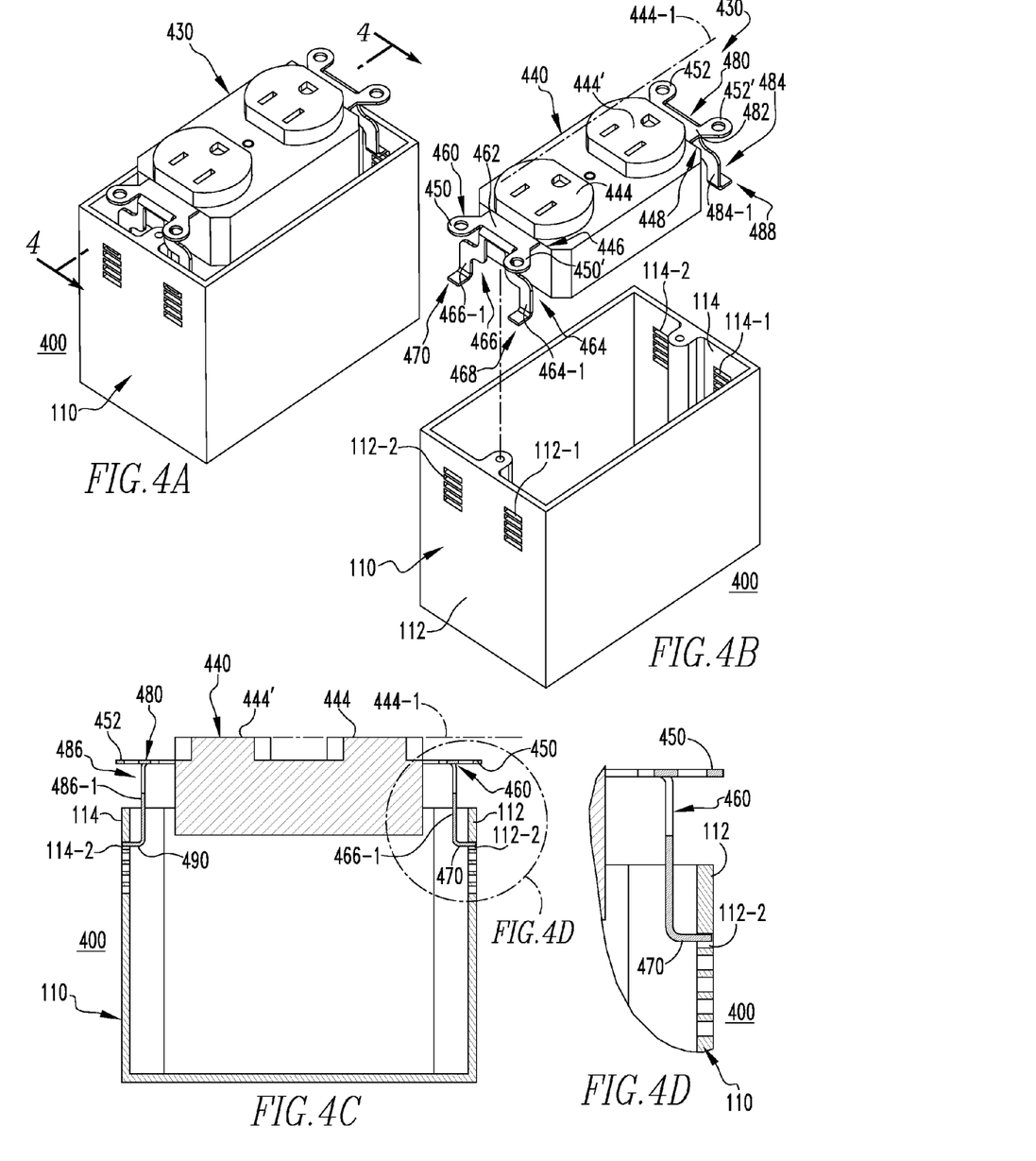
FIGS. 4A and 4B are front isometric and exploded front isometric views, respectively, of a junction assembly and wiring device therefor, in accordance with another embodiment of the disclosed concept.
FIG. 4C is a section view of the junction assembly and wiring device therefor, taken along line 4-4 of FIG. 4A, shown with the mounting members in the extended position.
FIG. 4D is an enlarged view of a portion of the junction assembly and wiring device therefor of FIG. 4C.

FIGS. 4A and 4B show another non-limiting example embodiment of a junction assembly 400 in accordance with the disclosed concept. The example junction assembly 400 includes the housing 110 and a wiring device 430 structured to be removably coupled to the housing 110. Referring to FIG. 4B, the wiring device 430 has a body 440 and a number of mounting members 460,480 (two are shown) coupled to the body 440. The body 440 partially extends into the housing 110 and has a number of distal surfaces 444,444' each located in a plane 444-1. Additionally, the body 440 includes a first end portion 446 and a second end portion 448 opposite the first end portion 446. The wiring device 430 further has a number of support portions 450,450',452,452' (four are shown) structured to support the wiring device 430 during installation. As seen, the first support portions 450,450' and the mounting member 460 are preferably a single piece of material. Similarly, the second support portions 452,452' and the mounting member 480 are preferably a single piece of material. As shown, the first support portions 450,450' are located on the first end portion 446 and the second support portions 452,452' are located on the second end portion 448. Additionally, the mounting member 460 is located proximate the first end portion 446 and the mounting member 480 is located proximate the second end portion 448.

Each of the mounting members 460,480 respectively includes a base 462,482 and side portions 464,466,484,486 (see FIG. 4C) extending from the base 462,482 away from the distal surfaces 444,444'. The side portions 464,466,484,486 (see FIG. 4C) respectively each have a corresponding wall 464-1,466-1,484-1,486-1 (see FIG. 4C) extending from the corresponding base 462,482, as shown. As seen, the wall 464-1 is spaced from and is generally coplanar with the wall 466-1. Furthermore, it will be appreciated that the wall 484-1 is likewise spaced from and is generally coplanar with the wall 486-1. The bases 462,482 of the respective mounting members 460,480 are located near the distal surfaces 444, 444' and are generally parallel to the plane 444-1. Additionally, the walls 464-1,466-1,484-1,486-1 (see FIG. 4C) are generally normal to the plane 444-1.

The mounting members 460,480 respectively further include a number of protrusions 468,470,488,490 (see FIG. 4C). Each of the protrusions 468,470,488,490 (see FIG. 4C) respectively extends from one of the walls 464-1,466-1,484-1,486-1 (see FIG. 4C) away from the body 440 and is structured to extend into a corresponding one of the slots 112-1, 112-2,114-1,114-2. The protrusions 468,470,488,490 (see FIG. 4C) are each generally normal to the corresponding wall 464-1,466-1,484-1,486-1 (see FIG. 4C). Additionally, similar to the mounting members 160,180,260,280,360,380 described hereinabove, the mounting members 460,480 are structured to move between an extended position and a retracted position in order to maintain the body 440 in the housing 110 and also to release the body 440 from the housing 110, as will be discussed hereinbelow.

FIG. 4C shows a section view of the junction assembly 400 with the mounting members 460,480 in the extended position. As seen, each of the protrusions 470,490 extends into a corresponding one of the slots 112-2,114-2. It will be appreciated that the other protrusions (i.e., protrusion 468 of mounting member 460 and protrusion 488 of mounting member 480) likewise extend into a corresponding one of the slots (i.e., slots 112-1,114-1) when the mounting members 460, 480 are in the extended position.

Figure 4E:
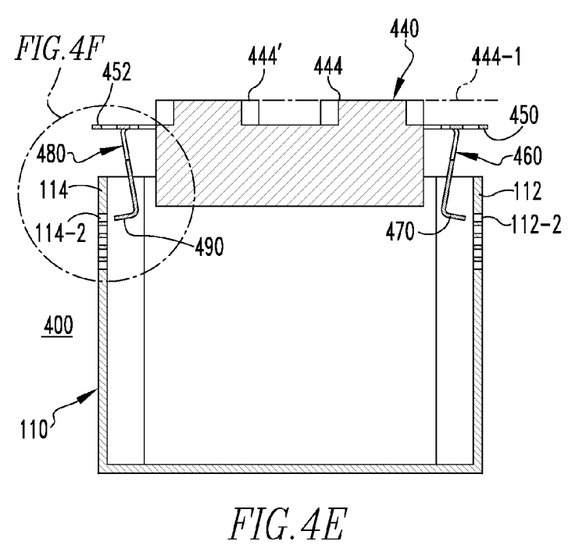
FIG. 4E is another section view of the junction assembly and wiring device therefor of FIG. 4C, shown with the mounting members in the refracted position.

Referring to FIG. 4D, when the protrusion 470 extends into the slot 112-2 (i.e., when the mounting member 460 is in the extended position), the wall 112 surrounds the protrusion 470 and prevents the protrusion 470 from moving in a direction normal to the plane 444-1 (FIGS. 4B, 4C, 4E). Similarly, when the other protrusions 468,488,490 extend into the corresponding slots 112-1,114-1,114-2, the walls 112,114 surround the corresponding protrusions 468,488,490 and prevent the protrusions 468,488,490 from moving in a direction normal to the plane 444-1. In this manner, when the mounting members 460,480 are in the extended position (FIGS. 4C and 4D), the protrusions 468,470,488,490 prevent the body 440 from moving in a direction normal to the plane 444-1. Thus, the mounting members 460,480 advantageously maintain the body 440 in a predetermined position with respect to the housing 110. In other words, the body 440 is retained or fixed in the housing 110 when the mounting members 460,480 are in the extended position (FIGS. 4C and 4D) and is only able to be released when the mounting members 460,480 move to the retracted position.

FIG. 4E shows a section view of the junction assembly 400 with the mounting members 460,480 in the retracted position. As seen, each of the protrusions 470,490 does not extend into a corresponding one of the slots 112-2,114-2. In other words, each of the protrusions 470,490 is entirely internal with respect to the corresponding walls 112,114 (i.e., the protrusion 470 is spaced from the plane of the generally planar wall 112 and the protrusion 490 is spaced from the plane of the generally planar wall 114). It will be appreciated that the other protrusions (i.e., protrusion 468 of mounting member 460 and protrusion 488 of mounting member 480) likewise do not extend into a corresponding one of the slots (i.e., slots 112-1,114-1) and are entirely internal with respect to the corresponding walls 112,114 when the mounting members 460,480 are in the retracted position (FIGS. 4E and 4F).

Figure 4F:
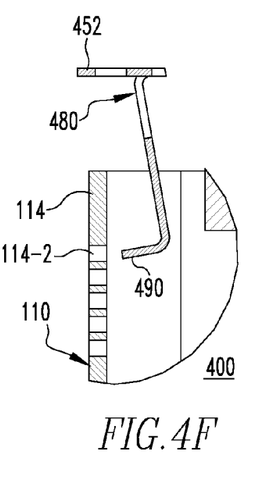
FIG. 4F is an enlarged view of a portion of the junction assembly and wiring device therefor of FIG. 4E.

Referring to FIG. 4F, the wall 114 does not surround the protrusion 490. Similarly, when the other protrusions 468, 470,488 do not extend into the corresponding slots 112-1, 112-2,114-1, the walls 112,114 do not surround the corresponding protrusions 468,488,490. In this manner, when the mounting members 460,480 are in the retracted position (FIGS. 4E and 4F), the clearance between the mounting members 460,480 and the corresponding walls 112,114 advantageously enables the body 440 (which is coupled to the mounting members 460,480) to move in a direction normal to the plane 444-1 (FIGS. 4B, 4C and 4E). In other words, in the retracted position, the mounting members 460,480 do not maintain the body 440 in the housing 110.

As seen in FIGS. 4C and 4E, responsive to the mounting members 460,480 moving from the extended position (FIG. 4C) toward the retracted position (FIG. 4E), the respective protrusions 468 (see FIG. 4B), 470,488 (see FIG. 4B), 490 move toward the body 440, thereby releasing the body 440 from the housing 110. Furthermore, responsive to the mounting member 460 moving from the extended position (FIG. 4C) toward the retracted position (FIG. 4E), the respective protrusions 468 (see FIG. 4B), 470 move away from the first support portions 450,450'. Responsive to the mounting member 480 moving from the extended position (FIG. 4C) toward the retracted position (FIG. 4E), the respective protrusions 488 (see FIG. 4B), 490 move away from the second support portions 452,452'. It will be appreciated that by employing the mounting members 460,480, the wiring device 430 and associated junction assembly 400 has the same advantages as those discussed above with respect to the embodiments of FIGS. 1A-1G, 2A-2G and 3A-3F.

Figures 5A, 5B:
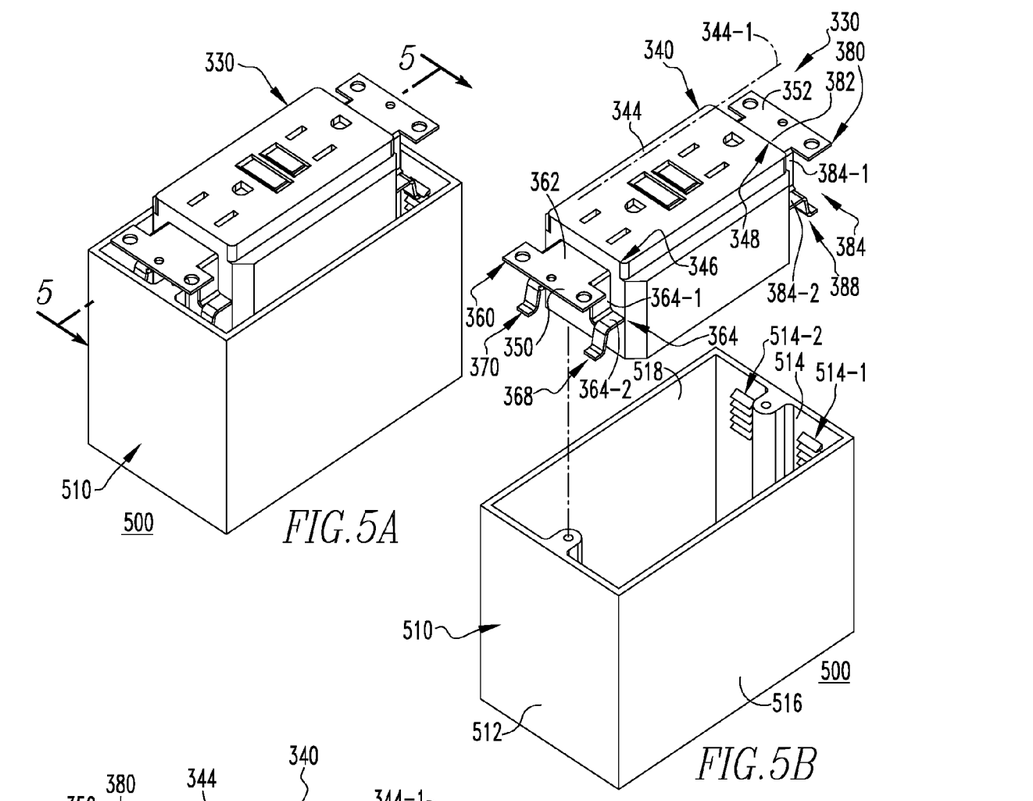
FIGS. 5A and 5B are front isometric and exploded front isometric views, respectively, of a junction assembly that includes the wiring device of FIGS. 3A-3F and an alternative housing, in accordance with an alternative embodiment of the disclosed concept.
Figure 5C:
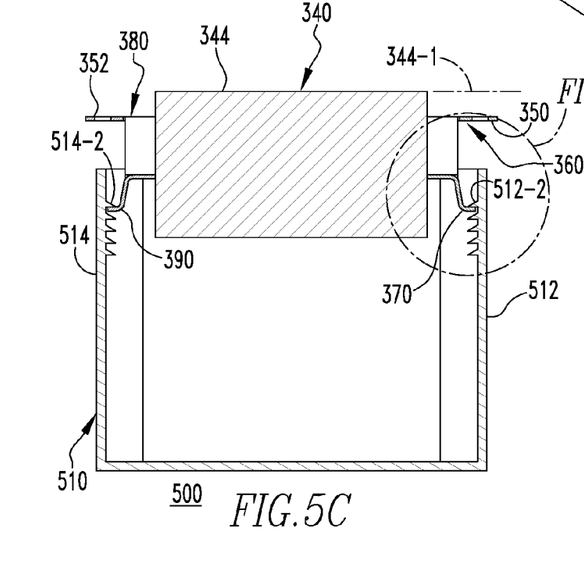
FIG. 5C is a section view of the junction assembly and wiring device therefor, taken along line 5-5 of FIG. 5A, shown with the mounting members in the extended position.

FIGS. 5A and 5B show another non-limiting example embodiment of a junction assembly 500 in accordance with the disclosed concept. The example junction assembly 500 includes a housing 510 and the wiring device 330 structured to be removably coupled to the housing 510. As seen in FIG. 5A, the body 340 partially extends into the housing 510. Referring to FIG. 5B, the housing 510 includes a pair of opposing and generally parallel walls 512,514. Another pair of opposing and generally parallel walls 516,518 connects the first wall 512 to the second wall 514. The wall 514 includes a number of rows of teeth (for ease of illustration only one tooth 514-1,514-2 is indicated per row). It will be appreciated that the wall 512, which is symmetric with the wall 514, includes a number of rows of teeth (tooth 512-2 is indicated in FIG. 5C) substantially the same as the wall 514. It will further be appreciated that by having rows of teeth 512-2,514-1,514-2, the body 340 is able to be maintained at varying depths with respect to the housing 510.

FIG. 5C shows a section view of the junction assembly 500 with the mounting members 360,380 in the extended position. As seen, the protrusion 370 substantially overlays and is flush with the tooth 512-2 and the protrusion 390 substantially overlays and is flush with the tooth 514-2. It will be appreciated that the other protrusions (i.e., protrusion 368 of mounting member 360 and protrusion 388 of mounting member 380) likewise substantially overlay and are flush with a corresponding one of the teeth (i.e., tooth 514-1 on the wall 514 and the corresponding tooth on the symmetric wall 512) when the mounting members 360,380 are in the extended position.

Figure 5D:
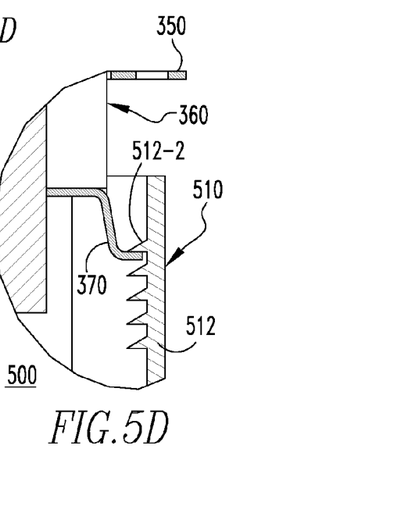
FIG. 5D is an enlarged view of a portion of the junction assembly and wiring device therefor of FIG. 5C.
Figure 5E:
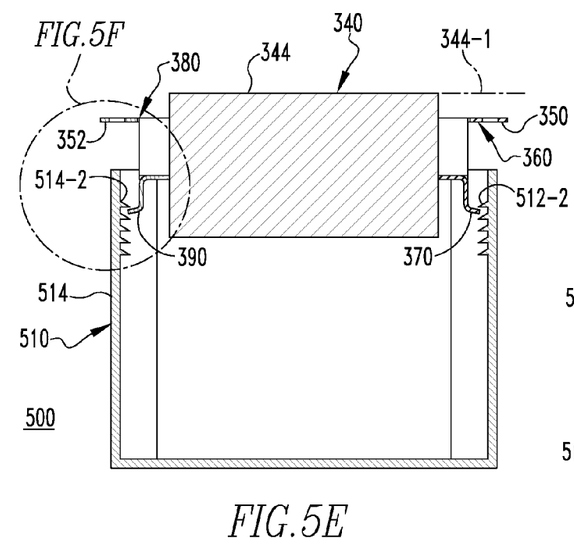
FIG. 5E is another section view of the junction assembly and wiring device therefor of FIG. 5C, shown with the mounting members in the refracted position.

Referring to FIG. 5D, when the protrusion 370 substantially overlays the tooth 512-2 (i.e., when the mounting member 360 is in the extended position), the tooth 512-2 prevents the protrusion 370 from moving in a direction normal to the plane 344-1 (FIGS. 5B, 5C, 5E). Similarly, when the other protrusions 368,388,390 substantially overlay the corresponding teeth 514-1,514-2, the teeth 514-1,514-2 prevent the protrusions 368,388,390 from moving in a direction normal to the plane 344-1. In this manner, when the mounting members 360,380 are in the extended position (FIGS. 5C and 5D), the protrusions 368,370,388,390, which are blocked by the teeth 512-2,514-1,514-2, prevent the body 340 from moving in a direction normal to the plane 344-1 and advantageously maintain the body 340 in a predetermined position with respect to the housing 510.

FIG. 5E shows a section view of the junction assembly 500 with the mounting members 360,380 in the retracted position. As seen, each of the protrusions 370,390 does not substantially overlay the corresponding tooth 512-2,514-2. In other words, each of the protrusions 370,390 is generally internal with respect to the corresponding walls 512,514 (i.e., the protrusion 370 is spaced from the plane of the generally planar wall 512 and the protrusion 390 is spaced from the plane of the generally planar wall 514). It will be appreciated that the other protrusions (i.e., protrusion 368 of mounting member 360 and protrusion 388 of mounting member 380) likewise do not substantially overlay a corresponding one of the teeth (i.e., tooth 514-1 on the wall 514 and the corresponding tooth on the symmetric wall 512) and are generally internal with respect to the corresponding walls 512,514 when the mounting members 360,380 are in the retracted position (FIGS. 5E and 5F).

Figure 5F:
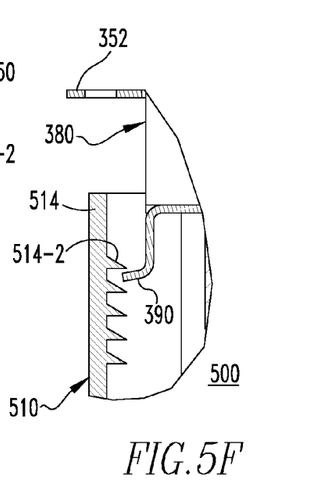
FIG. 5F is an enlarged view of a portion of the junction assembly and wiring device therefor of FIG. 5E.

Referring to FIG. 5F, the protrusion 390 does not substantially overlay the tooth 514-2 and is generally angled (i.e., not flush) with the tooth 514-2. Similarly, in the retracted position, the other protrusions 368,370,388 do not substantially overlay the corresponding teeth 512-2,514-1 and are generally angled (i.e., not flush) with the teeth 512-2,514-1. In this manner, when the mounting members 360,380 are in the retracted position (FIGS. 5E and 5F), even incidental contact between the protrusions 368,370,388,390 and the corresponding teeth 512-2,514-1,514-2 will not prevent the body from being able to move in a direction normal to the plane 344-1 (FIGS. 5B, 5C and 5E). In other words, responsive to the mounting members 360,380 moving from the extended position to the retracted position, the respective protrusions 368,370,388,390 move toward the body 340, thereby releasing the body 340 from the housing 510. It will be appreciated junction assembly 500 has the same advantages as those discussed above with respect to the embodiments of FIGS. 1A-1G, 2A-2G, 3A-3F, and 5A-5F.

Although the housing 510 has been described in association with the wiring device 330, it will be appreciated that the housing 510 may be employed with any suitable alternative wiring device (e.g., without limitation, wiring devices 130, 230,430) in a manner substantially the same as described herein in association with the junction assembly 500. Moreover, it is within the scope of the disclosed concept for a junction assembly (not shown) to have other housings (not shown) with a suitable alternative shape and/or configuration different than the housings 110,510, in order to perform desired function of enabling a body (e.g., without limitation, bodies 140,340,440) to be maintained and released in a similar manner as described herein in association with the junction assemblies 100,200,300,400,500.

It will be appreciated that the mounting members 160,180, 260,280,360,380,460, 480 may be moved from the extended position to the retracted position by any known mechanism (e.g., without limitation, inserting a relatively flat tool (not shown) into a respective housing 110,510 in order to engage the respective protrusions 168,170,188,190,268, 270,288,290,368,370,388,390,468,470,488,490 to cause them to move toward the respective body 140,240,340,440). Additionally, it is not necessary for both of the respective mounting members 160,180,260,280,360,380,460,480 of a respective wiring device 130,230,330,430 to move between positions in order to release the respective body 140,240,340, 400 from the respective housing 110,510.

Additionally, as illustrated herein, the wiring devices 130, 230,330,430 are electrical outlet receptacles. However, it will be appreciated that the disclosed concept may be employed with any suitable alternative wiring device (e.g., without limitation, cable connectors, indicator lights, switches, industrial equipment) (not shown), without departing from the scope of the disclosed concept. Furthermore, it is within the scope of the disclosed concept for a mounting member (not shown) to have any suitable alternative shape and/or configuration in order to perform the desired function of maintaining and releasing a body (e.g., without limitation, bodies 140,340, 440) from a housing (e.g., without limitation, housings 110, 510). Additionally the protrusions 168,170,188,190,268,270, 288,290,368,370,388,390,468,470,488, 490 may have a distal width that is significantly narrower (i.e., less than one half) than the width of the respective slots 112-1,112-2,114- 1,114-2 or the respective teeth 512-2,514-1,514-2 so that the respective wiring device 130,230,330,430 can slide within the respective housing 110,510 in order to plumb (rotate) the wiring device 130,230,330,430.

Accordingly, it will be appreciated that the disclosed concept provides for an improved (e.g., without limitation, easier to install and remove) junction assembly (e.g., without limitation, junction assemblies 100,200,300,400,500), and wiring device 130,230,330,430 therefor, which among other benefits, advantageously enables a body 140,340,440 to be maintained and released from a corresponding housing 110, 510 in significantly less time and with less chance of losing parts.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A wiring device for a junction assembly, said junction assembly comprising a housing having at least one wall, said at least one wall having a number of slots or recesses, said wiring device comprising:
a body; and
at least one mounting member coupled to said body, said at least one mounting member comprising a base, a side portion extending from said base, and a protrusion extending from said side portion away from said body,
wherein said at least one mounting member moves between an extended position corresponding to said protrusion extending into a corresponding one of said number of slots or recesses in order to removably couple said body to said housing without a separate fastener, and a retracted position corresponding to said protrusion not extending into said corresponding one of said number of slots or recesses, thereby releasing said body from said housing.

2. The wiring device of claim 1 wherein said body comprises a distal surface; wherein said base is disposed proximate said distal surface; and wherein said side portion of said at least one mounting member extends from said base away from said distal surface.

3. The wiring device of claim 2 wherein said distal surface is disposed in a plane; wherein said base is generally parallel to said plane; wherein said at least one mounting member comprise another side portion extending from said base; wherein said side portion of said at least one mounting member comprises a first wall extending from proximate said base and being disposed generally normal to the plane; and wherein said another side portion comprises a second wall extending from proximate said base and being disposed generally normal to the plane.

4. T wiring device of claim 3 wherein said side portion of said at least one mounting member further comprises a first platform extending from said first wall and being disposed generally parallel to said base; wherein said another side portion further comprises a second platform extending from said second wall and being disposed generally parallel to said base; wherein said protrusion extends from said first platform; and wherein said at least one mounting member comprises a second protrusion extending from said second platform.

5. The wiring device of claim 2 wherein said side portion of said at least one mounting member comprises a first wall; wherein said at least one mounting member further comprises a another side portion extending from said base, wherein said another side portion comprises a second wall spaced from and generally coplanar with said first wall; wherein said protrusion extends from and is disposed generally normal to said first wall; and wherein said second at least one mounting member further comprises a second protrusion extending from and being disposed generally normal to said second wall.

6. The wiring device of claim 2 wherein said body comprises a first end portion and a second end portion opposite the first end portion; wherein said at least one mounting member comprises a first mounting member and a second mounting member; wherein said first mounting member is disposed proximate the first end portion; wherein said second mounting member is disposed proximate the second end portion; wherein said wiring device further comprises a first support portion and a second support portion opposite said first support portion; wherein said first support portion is disposed on the first end portion; and wherein said second support portion is disposed on the second end portion.

7. The wiring device of claim 6 wherein said distal surface is disposed in a plane; wherein said first support portion is disposed between said base of said first mounting member and the plane; and wherein said second support portion is disposed between said base of said second mounting member and the plane.

8. The wiring device of claim 7 wherein said wiring device further comprises a first fastener and a second fastener; wherein said first fastener fastens said first mounting member to said first support portion and is movable with respect to said first support portion; and wherein said second fastener fastens said second mounting member to said second support portion and is movable with respect to said second support portion.

9. The wiring device of claim 6 wherein said distal surface is disposed in a plane; wherein said base of said first mounting member is disposed between said first support portion and the plane; and wherein said base of said second mounting member is disposed between said second support portion and the plane.

10. The wiring device of claim 9 wherein said first mounting member is coupled to said first support portion by a first snap-fit mechanism; and wherein said second mounting member is coupled to said second support portion by a second snap-fit mechanism.

11. The wiring device of claim 6 wherein said first support portion and said first mounting member are a single piece of material; and wherein said second support portion and said second mounting member are a single piece of material.

12. The wiring device of claim 6 wherein, responsive to said first mounting member moving from the extended position toward the retracted position, said protrusion of said first mounting member moves away from said first support portion; and wherein, responsive to said second mounting member moving from the extended position toward the retracted position, said protrusion of said second mounting member moves away from said second support portion.

13. A junction assembly comprising:
a housing having a first wall and a second -will disposed opposite said first wall, each of said first wall and said second wail having a number of slots or recesses; and
a wiring device comprising:
  a body, and
  a first mounting member and a second mounting member each coupled to said body, each of said first mounting member and said second mounting member comprising a base, a side portion extending from said base, and a protrusion extending from said side portion away from said body,
wherein said first mounting member moves between an extended position corresponding to said protrusion of said first mounting member extending into a corresponding one of said number of slots or recesses of said first wall in order to removably couple said body to said housing without a separate fastener, and a retracted position corresponding to said protrusion of said first mounting member not extending into said corresponding one of said number of slots or recesses of said first wall, thereby releasing said body from said housing, and
wherein said second mounting member moves between an extended position corresponding to said protrusion of said second mounting member extending into a corresponding one of said number of slots or recesses of said second wall in order to removably couple said body to said housing without a separate fastener, and a retracted position corresponding to said protrusion of said second mounting member not extending into said corresponding one of said number of slots or recesses of said second wall, thereby releasing, said body from said housing.

14. The junction assembly of claim 13 wherein said body comprises a first end portion and a second end portion opposite the first end portion; wherein said first mounting member is disposed proximate the first end portion; wherein said second mounting member is disposed proximate the second end portion; wherein said first mounting member further comprises another side portion extending from said base of said first mounting member, and another protrusion extending from said another side portion of said first mounting member away from said body; wherein said second mounting member further comprises another side portion extending from said base of said second mounting member, and another protrusion extending from said another side portion of said second mounting member away from said body; wherein the number of slots of said first wall is a first slot for the protrusion of said first mounting member and a second slot for the another protrusion of said first mounting member; wherein the number of slots of said second wall is a third slot for the protrusion of said second mounting member and a fourth slot for the another protrusion of said second mounting member.

15. The junction assembly of claim 13 wherein said housing comprises a first tooth disposed on said first wall and a second tooth disposed on said second wall; wherein, when said first mounting member is in the extended position, said protrusion of said first mounting member substantially overlays said first tooth, and wherein, when said second mounting member is in the extended position, said protrusion of said second mounting member substantially overlays said second tooth.

16. The junction assembly of claim 15 wherein said body comprises a first end portion and a second end portion opposite the first end portion; wherein said first mounting member is disposed proximate the first end portion; wherein said second mounting member is disposed proximate the second end portion; wherein said first mounting member further comprises another side portion extending from said base of said first mounting member, and another protrusion extending from said another side portion of said first mounting member away from said body; wherein said second mounting member further comprises another side portion extending from said base of said second mounting member, and another side protrusion extending from said another side portion of said second mounting member away from said body; wherein said first wall is disposed proximate the first end portion; wherein said second wall is disposed proximate the second end portion; wherein said housing further comprises a third tooth disposed on said first wall and a fourth tooth disposed on said second wall, wherein, when said first mounting member is in the extended position, said another protrusion of said first mounting member substantially overlays said third tooth; and wherein, when said second mounting member is in the extended position, said another protrusion of said second mounting member substantially overlays said fourth tooth.

17. The junction assembly of claim 15 wherein, when said first mounting member is in the retracted position, said protrusion of said first mounting member does not substantially overlay said first tooth; and wherein, when said second mounting member is in the retracted position, said protrusion of said second mounting member does not substantially overlay said second tooth.

* * * * *